Nov. 19, 1963     A. H. CROUCHER     3,110,994
APPARATUS FOR THE MANUFACTURE OF SACHETS
Filed May 31, 1960     8 Sheets-Sheet 1

Inventor,
ANTONY H. CROUCHER,
by *Wallis Hughes*
Attorney.

Nov. 19, 1963  A. H. CROUCHER  3,110,994
APPARATUS FOR THE MANUFACTURE OF SACHETS
Filed May 31, 1960  8 Sheets-Sheet 7

Inventor,
ANTONY H. CROUCHER,
by Hall & Houghton
Attorney.

United States Patent Office 3,110,994
Patented Nov. 19, 1963

3,110,994
APPARATUS FOR THE MANUFACTURE OF SACHETS
Antony Harry Croucher, "Homewood," West End Lane, Esher, Surrey, England
Filed May 31, 1960, Ser. No. 32,907
Claims priority, application Great Britain June 22, 1959
10 Claims. (Cl. 53—180)

This invention relates to apparatus for the manufacture of sachets.

Such sachets are normally made by feeding a tube of thermoplastic material filled with the material to be packed, e.g. liquid, paste or powder, through a press which is periodically closed to flatten the tube, the wall of the tube being welded while held in the flattened position.

Alternatively the sachets may be made from two superposed strips appropriately welded together, being filled before completion of the welding.

The invention consists in apparatus for making sachets in which a single camshaft carries cams for controlling the feed of the tube or strips, the closing and opening of the press and the initiation of the heating.

Preferably the feeding of the strips or tube is controlled by a cam operating strip- or tube-gripping means, and a further cam arranged to advance the strip or tube-gripping means together with the strips or tube, allowing it to return after release of the strip or tube.

Preferably also, the closure of the press is achieved by the corresponding cam acting on an hydraulic ram, provided with an adjustable relief valve for control of the pressure between the platens of the press.

Conveniently the heating current is arranged to be switched off by operation of at least one microswitch consequent upon movement of the movable platen of the press when the strip or tube material has softened.

Figure 1:
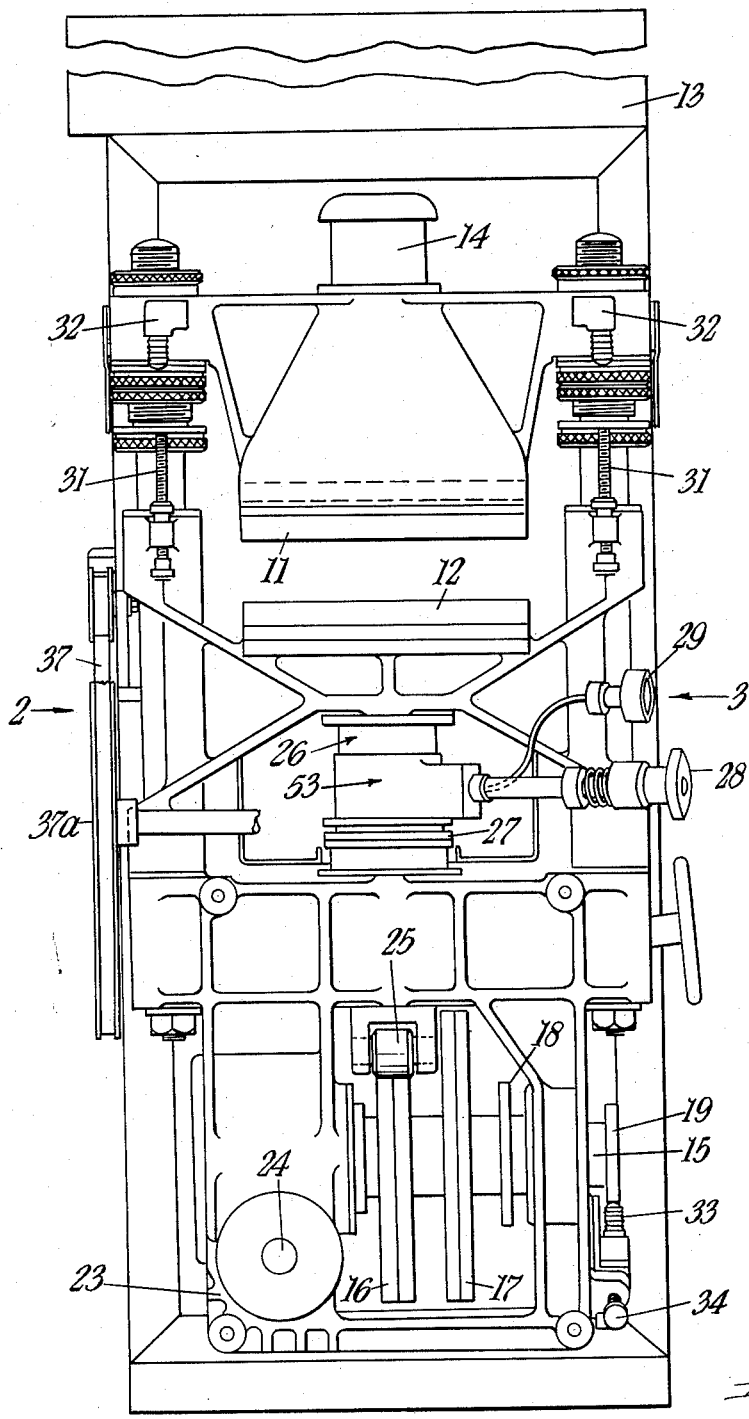
Figure 2:
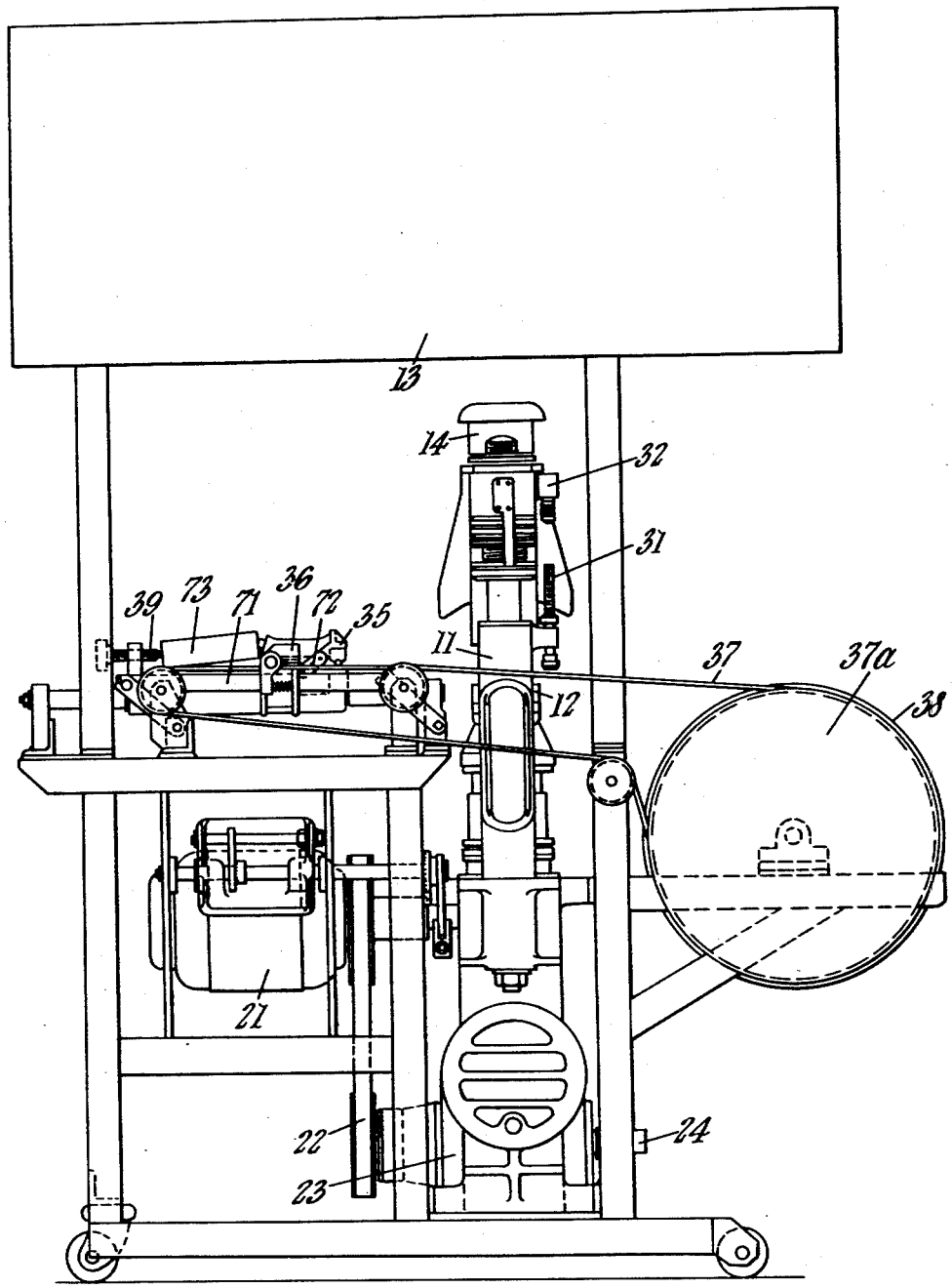
Figure 3:
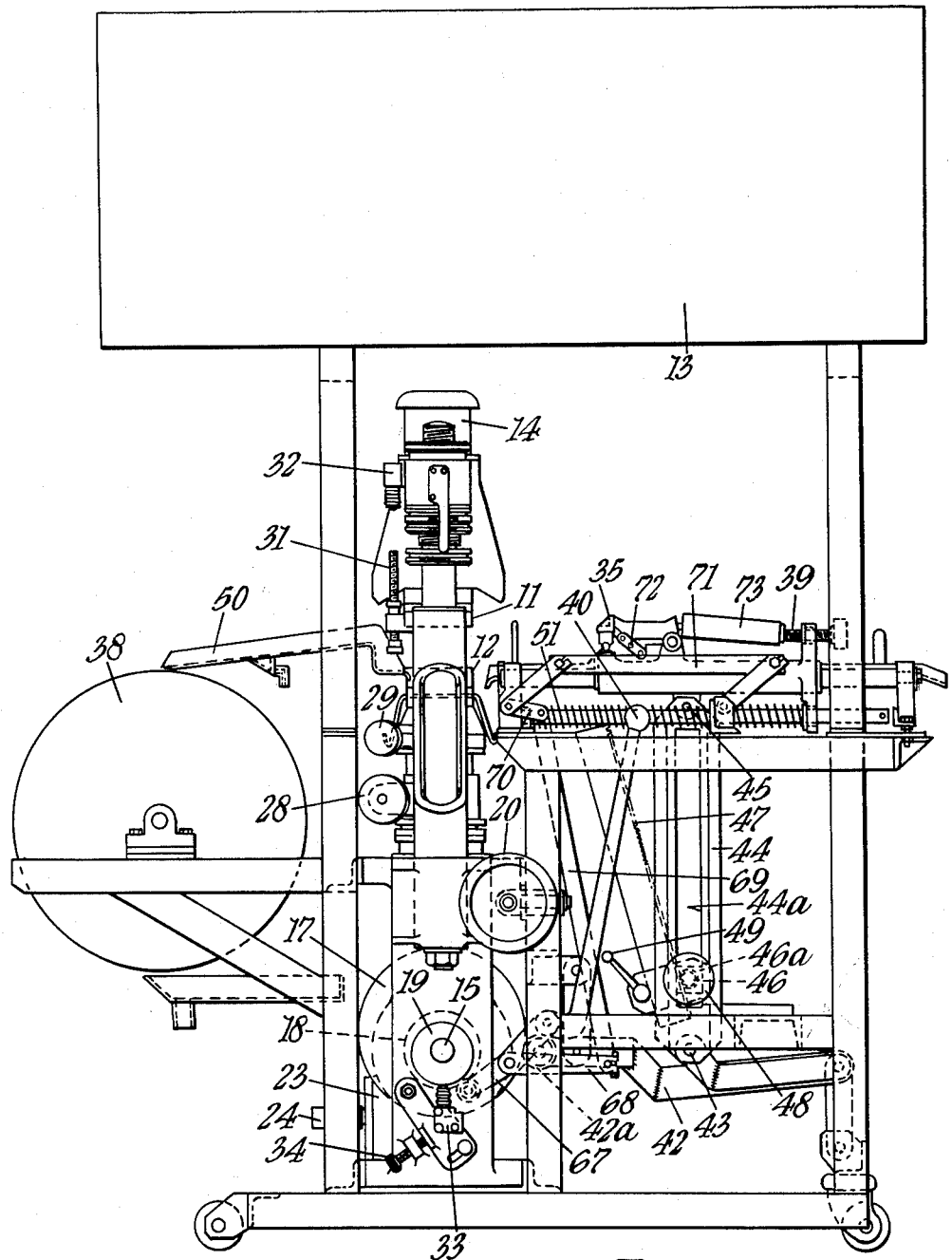
Figure 4:
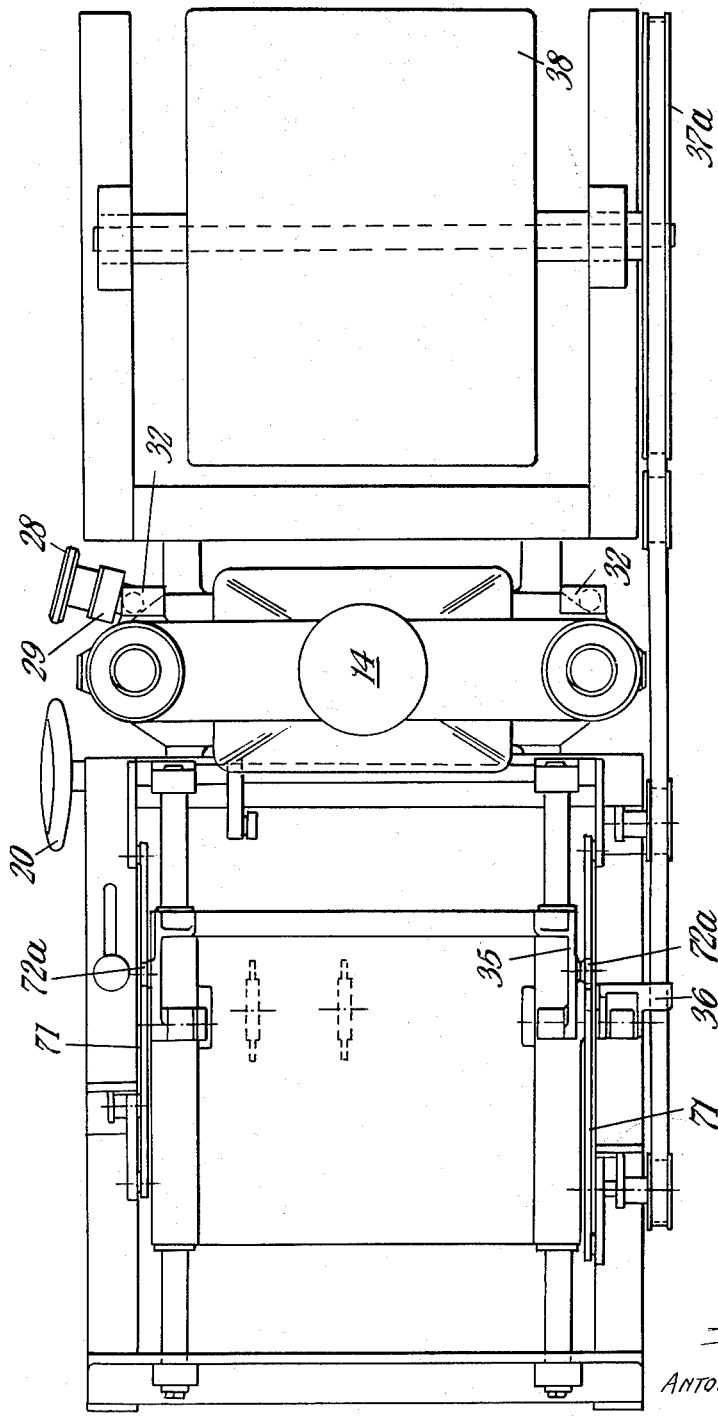
Figure 5:
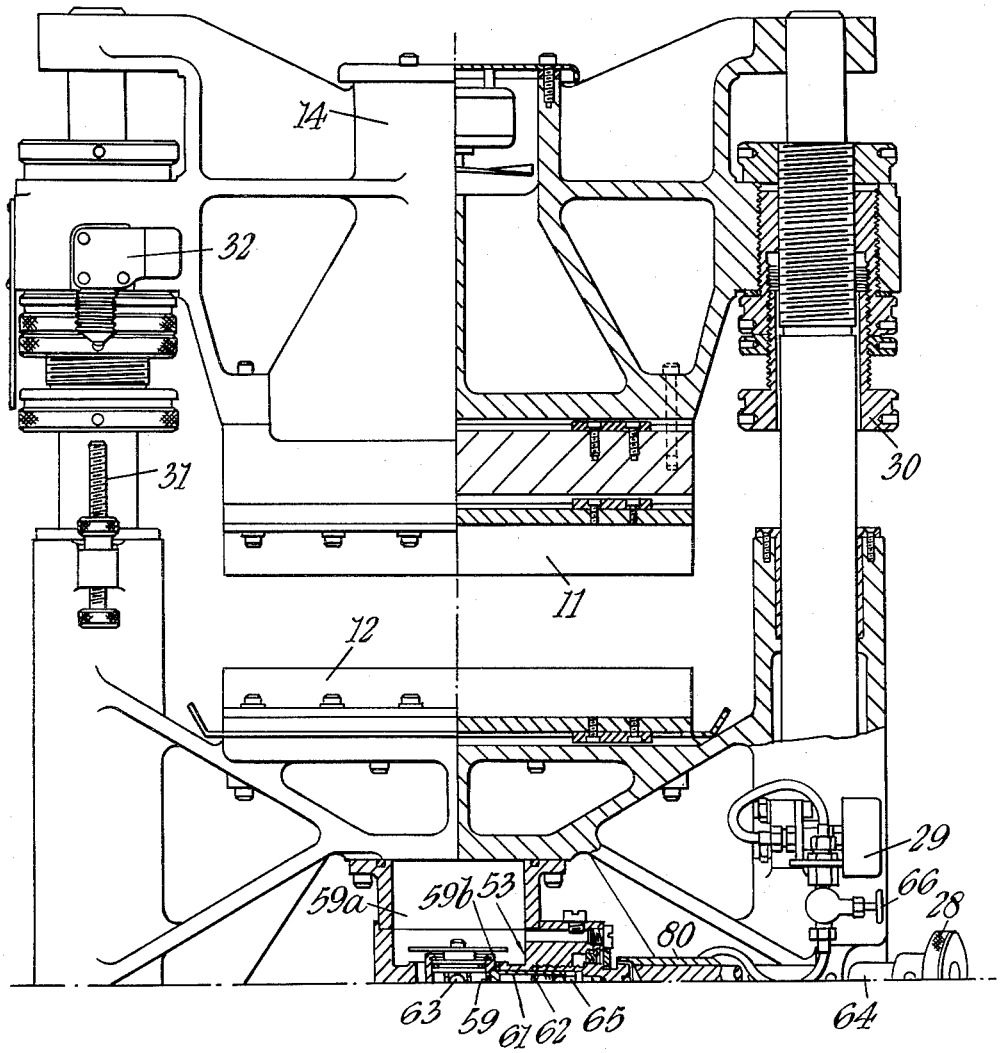
Figure 6:
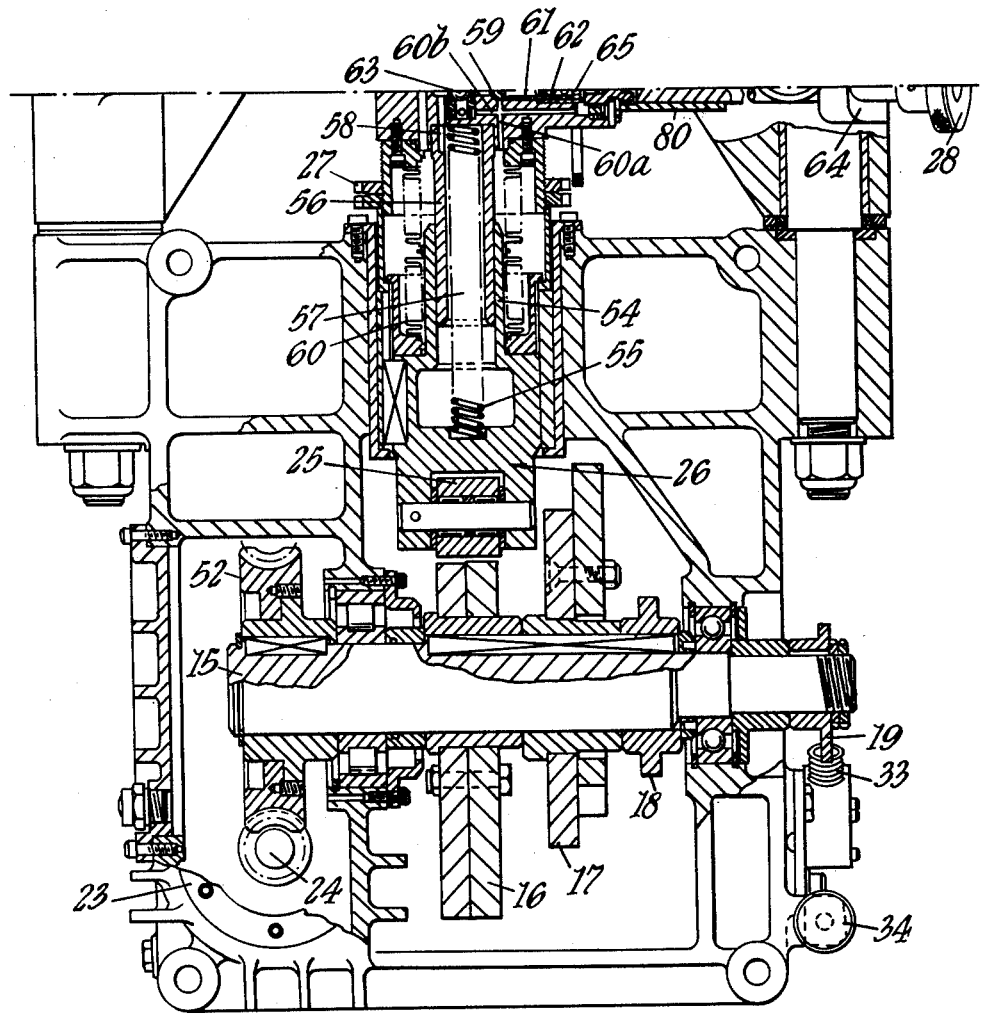
Figure 7:
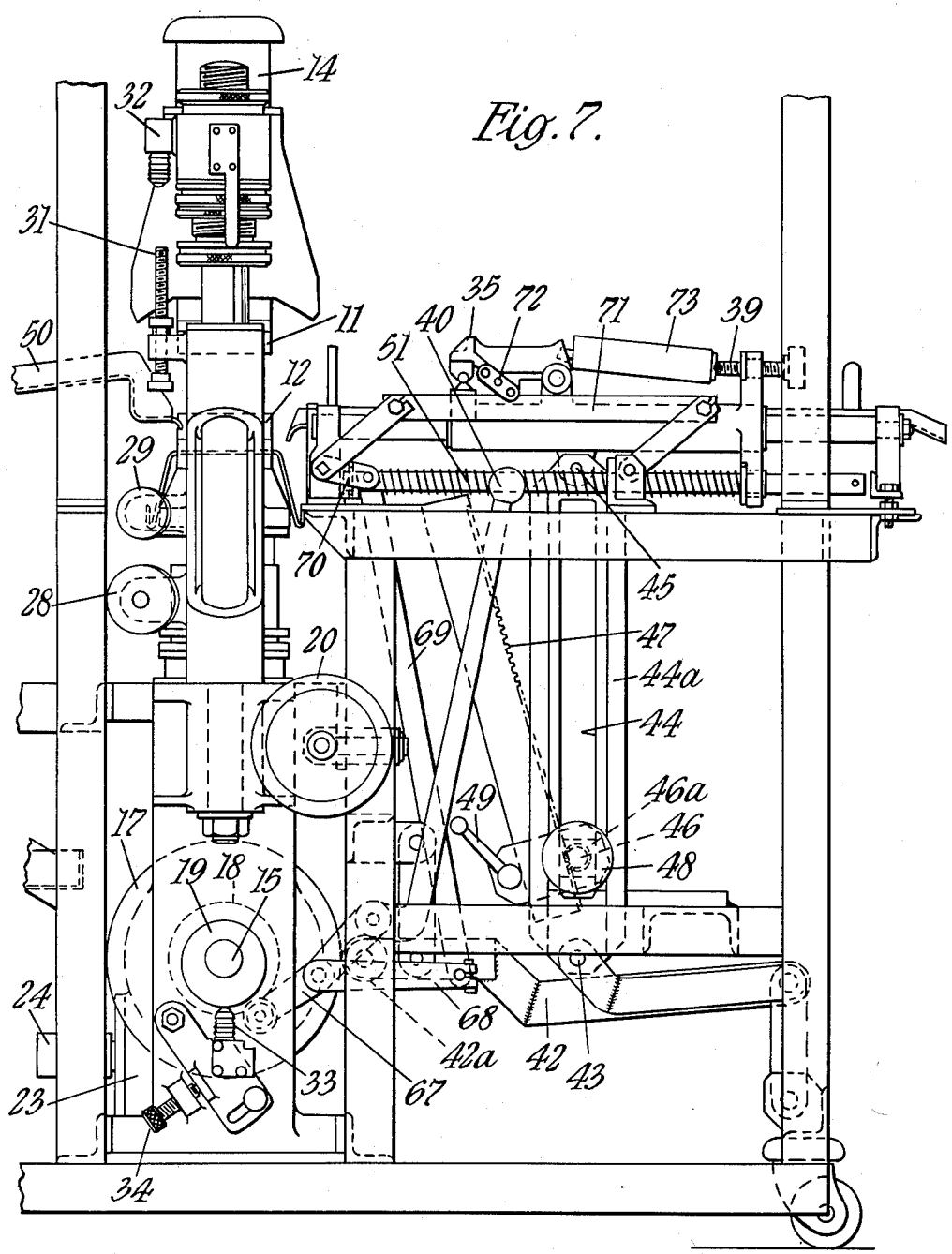
Figure 8:
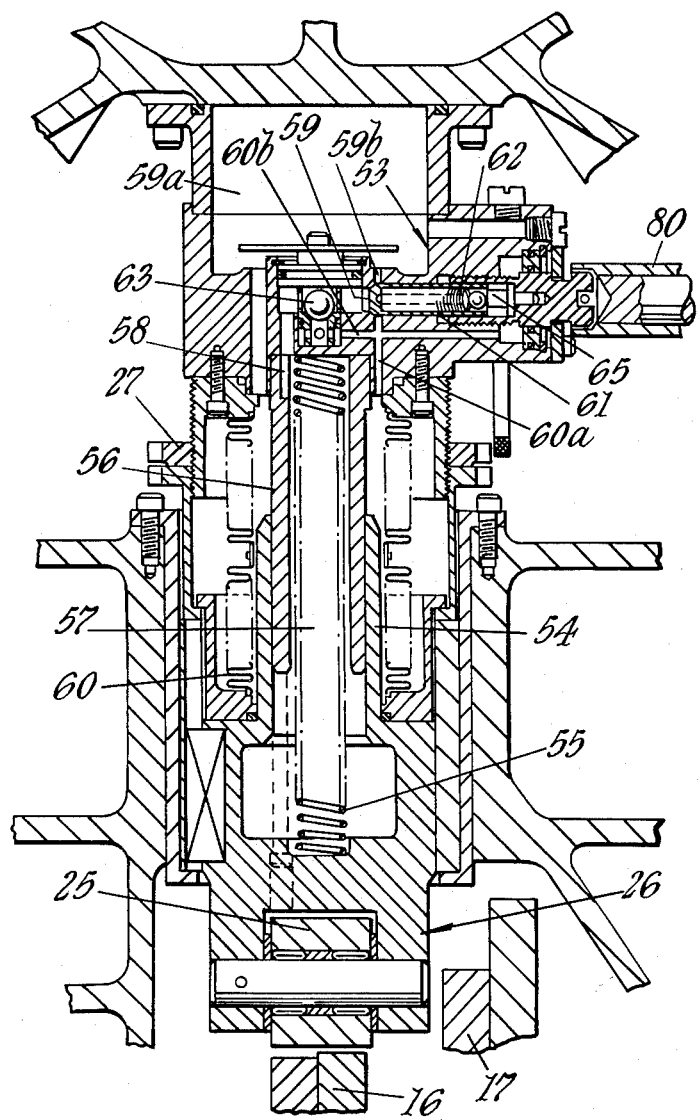

The invention will be further described with reference to the accompanying drawings in which:

FIGURE 1 is an end elevation of one form of machine according to the invention;
FIGURE 2 is a side elevation looking in the direction of the arrow 2 of FIGURE 1;
FIGURE 3 is a side elevation looking in the direction of arrow 3 of FIGURE 1;
FIGURE 4 is a plan view of the machine;
FIGURES 5 and 6 are respectively lower and upper portions of a section showing various details of the structure of FIGURE 1;
FIGURE 7 is a side elevational view of part of the subject matter illustrated in FIGURE 3 but on an enlarged scale; and
FIGURE 8 is an enlarged sectional view illustrating the subject matter of FIGURES 5 and 6.

Referring now to the drawings, there is shown an hydraulic press having a fixed platen 11 and a movable platen 12, each platen being arranged to be heated to weld the thermoplastic tube compressed between them. Reference numeral 13 indicates generally an R.F. heater unit for this purpose. A continuously running cooling fan 14 is arranged as indicated to cool the platens between welding operations.

Adjusting screws are provided for alteration of the position of the fixed platen on the pillars. Thus the stroke of the press may be varied and the alignment of the platens adjusted as necessary.

A single camshaft 15 carries thereon cams 16, 17, 18 and 19. Cams 16 and 17 are formed as double element cams with relatively movable elements for ease of adjustment. Camshaft 15 is driven by a motor 21 over a belt 22 and a worm drive 52 contained within a casing 23. A shaft 24 is provided so that the worm drive 52 and camshaft 15 may be turned over manually if required. A motor speed control is provided at 20.

Cam 16 co-operates with a follower 25 connected to a collapsing hydraulic ram 26, having a stroke adjustment 27. The collapsing pressure is controlled by a valve 53 adjustable by handle 28 and the actual pressure is indicated on a gauge 29, which may be introduced to the circuit by operation of a cock 66.

The collapsing ram 26 operates the movable platen 12 and maintains pressure at a preset value.

The collapsible ram 26 comprises (see FIGURES 5 and 6) telescopically related members 54 and 56 urged apart by a spring 55 and defining between them a pressure chamber 57. The chamber 57 has a port 58 through which the pressure of the liquid in chamber 57 is transmitted to a face 59 of valve member 61 biased by a disc spring 62 and forming the operative part of the valve 53. When the members 54, 56 are being parted at the end of a stroke, a ball valve 63 allows liquid to enter the chamber 57 from a reservoir 59a via a metal bellows 60 and passages 60a and 60b.

When the pressure in the chamber 57 is sufficient to overcome spring 62, valve 61 partially uncovers an exhaust port 59b leading to the reservoir and the pressure is thus maintained at the desired value. The handle 28 is supported for rotation and axial movement in a bracket 64 and is threadedly received at 80 in the ram body and consequently rotation of handle 28 causes axial movement thereof. A seating member 65 for the spring 62 is entrained in the axial movement, so that the collapsing pressure of ram 26 may be simply varied by rotation of handle 28.

The movable part of the press carries adjustable rods 31 co-operable with adjustable microswitches 32 which are connected to the heater control. The operating adjustment is such that the rods are clear of the microswitches where the tube undergoing pressure is engaged but as soon as it has softened under heat the ram 26 closes the platen 12 further and also causes rods 31 to operate the microswitches 32 to switch off the heating current.

Adjustable stops 30 on the fixed platen 11 control the actual shrinkage to be allowed and rods 31 and microswitches 32 are set according to the setting of stops 30.

The cam 19 is caused to initiate the heating cycle by engaging a microswitch 33, which is adjustable as at 34, when the pressure is applied.

The cam 18 operates via a linkage 67, 68, 69, 70 to reciprocate a parallelogram linkage in each side of the apparatus, each having an upper horizontal guide member 71 on which bears a roller 72a mounted on one jaw 35 on axis 72. Upward movement of guide member 71 consequent upon rotation of cam 18 thus opens jaws 35 against a spring 73. The spring 73 operates to close the jaws 35 to grip the tube to be fed between the platens of the press, and also to close an associated grip 36 onto a belt 37 passing over a pulley 37a connected to a take off drum 38 at the discharge side of the press. The drum 38 (see in particular FIGURES 2 and 4) is of slightly larger radius than the pulley 37a so that its peripheral speed is slightly in excess of that of the pulley and thus of the rate of feeding of the tube when the jaws 35 and grip 36 are moved forward with the tube and belt 37 gripped. A pressure adjustment for the jaws 35 and grip 36 is provided at 39.

A handle 40 is provided manually to hold the jaws 35 closed and forward in an emergency to prevent leakage of the material being packaged, by acting on the linkage 68 between cam 18 and jaws 35.

Cam 17 operates through a follower 42a on the linkage indicated at 42 to reciprocate the lower end 43 of a lever 44 which attached at 45 to a carrier for the jaws 35. The carrier is loaded by a spring 51. The fulcrum of lever 44 is the axis of rotation of a pinion 46 rotatably mounted in a slide 46a co-operable with a slot 44a in the lever 44. The position of the fulcrum of lever 44 is variable by co-operation of the pinion 46 with a fixed rack 47. An operating handle 48 is provided for the pinion 46 together with a clamp 49 for locating the pinion in the set position. By variation of this fulcrum position a wide variety of stroke lengths for the feed can be obtained and the adjustment shown is very accurate in this respect.

In operation, after completion of the welding of a sachet and the parting of the platens of the press, cam 18 allows jaws 35 and grip 36 to hold the filled thermoplastic tube and the belt 37 respectively. Cam 17 then moves the jaws 35 and grip 36 forward thereby feeding the tube and belt, the latter rotating the drum 38 to move the completed sachet leaving chute 50. The slightly increased peripheral speed of drum 38 compared with the speed of the belt and jaws 35 ensures a good grip for this purpose.

Cam 18 then releases jaws 35 and grip 36 and cam 17 allows retraction of the carrier under the action of spring 51.

Cam 16 then closes the press with the maximum pressure allowed by ram 26 and cam 19 operates microswitch 33 to initiate the heating cycle.

When the plastic tube softens the jaws close a little further and rods 31 operate microswitches 32 to switch off the heating current.

Cam 16 then allows opening of the press and the cycle restarts.

Various modifications may be made within the scope of the invention. Thus the apparatus described may be adapted to the manufacture of sachets from strip material rather than tubes by suitable modification of the feed and welding arrangements and incorporation of a filling mechanism.

I claim:

1. Apparatus for making sachets having two end closures from a filled blank of thermoplastic material comprising means for advancing the blank stepwise, said advancing means comprising means for gripping the blank and lever means for oscillating said gripping means, said lever means having a slot, a movable pinion mounted in the slot, a fixed rack co-operable with said movable pinion and clamping means for retaining said pinion relative to the rack, means for compressing the blank to form an end closure of a sachet, means for heating the end closure so formed to weld it while under compression to seal said closure, a camshaft, first cam means on said camshaft operating to control the means for advancing the blank, second cam means on said camshaft operating to close and open the compressing means and third cam means on said camshaft operating to initiate the application of heat by said heating means after closure of said compressing means, said first cam means comprising a cam portion for causing said gripping means to grip the blank and subsequently release it and a cam portion for causing said lever means to oscillate about said pinion to advance the gripping means with the gripped blank and allow it to return after release of the blank.

2. Apparatus as claimed in claim 1, further comprising a belt, second gripping means closable and advanceable simultaneously with said first mentioned gripping means to advance said belt simultaneously with the advance of said blank, and an offtake drum driven by said belt to collect the completed sachets.

3. Apparatus as claimed in claim 2, comprising a pulley rotatable with said drum and drivably engaged by said belt, said pulley being of slightly smaller radius than said drum so that the peripheral speed of the drum is somewhat greater than the linear speed of the belt and blank.

4. Apparatus as claimed in claim 1, in which the compressing means includes a press having a fixed platen and a movable platen, said movable platen including telescopically related members forming a collapsible hydraulic ram and a pre-settable pressure relief valve to regulate the thrust transmitted by the ram, said second cam means acting on one of said telescopically related members to move said movable platen towards said fixed platen.

5. Apparatus as claimed in claim 1, further comprising switch means for switching on said heating means, said switch means being actuated by third cam means, and separate switch means for switching off said heating means, said separate switch means being operable in response to softening of the part of the thermoplastic blank being heated.

6. Apparatus for making sachets having two end closures from a blank of thermoplastic material, comprising means for advancing the blank stepwise, means for compressing the blank to form an end closure of a sachet, said compressing means including a press having a fixed platen and a movable platen, means for heating the end closure formed by the compressing means to weld it while under compression to seal the closure, a camshaft, first cam means on said camshaft to control the means for advancing the blank, second cam means on said camshaft operating to close and open the platens, third cam means on said camshaft operating to initiate the application of heat by said heating means after closure of said platens, switch means for switching off said heating means, said switch means being mounted on one of said platens, and operating means for said switch means, said operating means being mounted on the other of said platens, the relative location of the switch means and operating means on the respective platens being such that when the platens are closed onto the blank the switch means and operating means are moved into close proximity but not in operative engagement the clearance between them being sufficiently small that upon softening of the plastic of the blank and consequent slight further closure of the platens the operating means engages and operates the switch means to switch off said heating means.

7. Apparatus as claimed in claim 6, in which adjustable stops are provided to limit the movement of the movable platen when the material has softened.

8. Apparatus for making sachets from a filled tube of thermoplastic material by successively sealing across the tube, comprising a camshaft, first, second, third and fourth cams on said camshaft, means for gripping the tube, linkage operatively connecting said gripping means with said first cam, second linkage means including an adjustable lever connecting said gripping means with said second cam for bodily oscillation of said gripping means in the feed direction of said tube, said first cam causing gripping of the tube before advance of the gripping means and release thereof before retraction of the gripping means, a press comprising a fixed and a movable platen, said movable platen being movable towards said fixed platen by said third cam, said movable platen including a pre-set collapsible hydraulic chamber to limit the pressure exerted on the part of the tube between the platen, heating means for heating the part of the tube between the platens, and switch means for switching on said heating means after closure of said platens, said switch means being co-operable with said fourth cam.

9. Apparatus for making sachets having two end closures from a filled blank of thermoplastic material, comprising means for advancing the blank stepwise, a press having a fixed platen and a movable platen, said movable platen including telescopically related members forming a collapsible hydraulic ram and a pre-settable pressure relief valve to regulate the thrust transmitted by the ram, a camshaft, first cam means on said camshaft operating to control the means for advancing the blank, second cam means operating as one of said telescopically movable members to move said movable platen towards said fixed platen, and third cam means on said camshaft operating to initiate the application of heat by said heating means after closure of said compressing means.

10. Apparatus for making sachets having two end closures from a filled blank of thermoplastic material comprising means for advancing the blank stepwise, means for compressing the blank to form an end closure of a sachet, means for heating the end closure so formed to weld it while under compression to seal said closure, a camshaft, first cam means on said camshaft operating to control the means for advancing the blank, second cam means on said camshaft operating to close and open the compressing means, separate switch means for switching off said heating means, and operating means for said separate switch means, said separate switch means and said operating means therefor being mounted on the compressing means so that slight further closure of the compressing means following softening of the part of the thermoplastic blank being heated causes relative movement between the separate switch and operating means to bring these into operative engagement.

References Cited in the file of this patent

UNITED STATES PATENTS

| | | |
|---|---|---|
| 2,649,673 | Bartelt | Aug. 25, 1953 |
| 2,764,862 | Rado | Oct. 2, 1956 |
| 2,878,728 | Clark | Mar. 24, 1959 |
| 2,884,988 | D'Angels | May 5, 1959 |
| 2,947,345 | Schjeldahl | Aug. 2, 1960 |

FOREIGN PATENTS

| | | |
|---|---|---|
| 156,167 | Australia | June 7, 1951 |